US012124034B2

(12) United States Patent
Wang et al.

(10) Patent No.: US 12,124,034 B2
(45) Date of Patent: Oct. 22, 2024

(54) MODULAR SYSTEM FOR HEAD-MOUNTED DEVICE

(71) Applicant: Apple Inc., Cupertino, CA (US)

(72) Inventors: Paul X. Wang, Cupertino, CA (US); Dinesh C. Mathew, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 16/378,357

(22) Filed: Apr. 8, 2019

(65) Prior Publication Data

US 2020/0201042 A1 Jun. 25, 2020

Related U.S. Application Data

(60) Provisional application No. 62/782,260, filed on Dec. 19, 2018.

(51) Int. Cl.
*G09G 5/12* (2006.01)
*G02B 27/01* (2006.01)

(52) U.S. Cl.
CPC ..... *G02B 27/0149* (2013.01); *G02B 27/0176* (2013.01); *G09G 5/12* (2013.01); *G02B 2027/0156* (2013.01); *G02B 2027/0178* (2013.01)

(58) Field of Classification Search
CPC ............ G02B 27/0149; G02B 27/0176; G02B 2027/0156; G02B 2027/0178; G09G 5/12
See application file for complete search history.

(56) References Cited

U.S. PATENT DOCUMENTS

| 9,910,298 B1 | 3/2018 | Sales et al. |
| 2002/0159023 A1 | 10/2002 | Swab |
| 2008/0013041 A1 | 1/2008 | Chou |

(Continued)

FOREIGN PATENT DOCUMENTS

| CN | 103999445 A | 8/2014 |
| CN | 104350412 A | 2/2015 |

(Continued)

OTHER PUBLICATIONS

International Search Report and Written Opinion from PCT/US2016/027619, dated Sep. 12, 2019, 13 pages.

(Continued)

*Primary Examiner* — Towfiq Elahi
(74) *Attorney, Agent, or Firm* — BAKERHOSTETLER

(57) ABSTRACT

Head-mounted devices can be formed as a modular system that provides a variety of different components and functions to achieve the results that are desired by a user. The modular configurations allow a user to easily customize a head-mounted device with one or more arm modules to provide features that integrate with other operations of the frame module of the head-mounted device. The arm modules can be easily exchanged with each other to provide different components and functions at different times. Accordingly, a frame module of a head-mounted device need not include permanent components that provide every function that will later be desired by the user. Instead, the head-mounted device can have expanded and customizable capabilities by the use of one or more arm modules.

18 Claims, 9 Drawing Sheets

(56) References Cited

U.S. PATENT DOCUMENTS

| | | | | |
|---|---|---|---|---|
| 2010/0149073 A1* | 6/2010 | Chaum | ............... | G02B 27/0093 345/8 |
| 2011/0001768 A1* | 1/2011 | Lin | ....................... | G09G 3/3685 345/698 |
| 2013/0293530 A1* | 11/2013 | Perez | ..................... | G06F 3/012 345/418 |
| 2015/0002374 A1 | 1/2015 | Erinjippurath et al. | | |
| 2018/0278924 A1* | 9/2018 | Schowengerdt | ... | G02B 27/0172 |
| 2019/0011699 A1* | 1/2019 | Moore | .................... | G06F 3/011 |

FOREIGN PATENT DOCUMENTS

| | | |
|---|---|---|
| CN | 204256668 U | 4/2015 |
| CN | 204576008 U | 8/2015 |
| CN | 105954878 A | 9/2016 |
| CN | 205644372 U | 10/2016 |
| CN | 206193378 U | 2/2017 |
| CN | 107290853 A | 10/2017 |
| CN | 107479200 A | 12/2017 |
| CN | 107561705 A | 1/2018 |
| CN | 107783287 A | 3/2018 |
| CN | 108020936 A | 5/2018 |
| CN | 108292044 | 7/2018 |
| CN | 208013550 U | 10/2018 |
| EP | 2439580 | 4/2012 |
| JP | 2001-272628 A | 10/2001 |
| JP | 2009-237450 A | 10/2009 |
| JP | 2013-242421 A | 12/2013 |
| JP | 2014-086905 | 5/2014 |
| JP | 2017-507383 | 3/2017 |
| WO | WO 2013/096052 | 6/2013 |
| WO | WO 2015/100008 | 7/2015 |
| WO | WO 2018/094226 | 5/2018 |
| WO | WO 2018/211673 | 11/2018 |
| WO | WO 2018/213010 | 11/2018 |

OTHER PUBLICATIONS

Chinese Evaluation Report for Utility Model from CN Patent No. ZL201920757997.3 d Mar. 25, 2020; 22 pages including English language translation.

Indian Office Action from Indian Patent Application No. 201914021621, dated Feb. 9, 2021, 7 pages.

Korean Notice of Allowance from Korean Patent Application No. 10-2021-7012718, dated Jun. 25, 2024, 3 pages including English language summary.

Chinese Office Action from Chinese Patent Application No. 201980072218.9, dated May 11, 2023, 12 pages including English language summary.

European Office Action from European Patent Application No. 19721472.9, dated Jul. 21, 2023, 7 pages.

Chinese Office Action from Chinese Patent Application No. 201980072218.9, dated Jul. 1, 2022, 13 pages including English language summary.

Indian Office Action from Indian Patent Application No. 202115035970, dated Jun. 30, 2022, 5 pages.

Japanese Office Action from Japanese Patent Application No. 2021-518873, dated May 10, 2022, 13 pages including English language translation.

Chinese Office Action from Chinese Patent Application No. 201980072218.9, dated Jul. 26, 2023, 14 pages including English language summary.

Chinese Office Action from Chinese Patent Application No. 201980072218.9, dated Feb. 23, 2023, 11 pages including English language summary.

Japanese Decision to Grant from Japanese Patent Application No. 2021-518873, dated Mar. 23, 2023, 4 pages including machine-generated English language translation.

Korean Office Action from Korean Patent Application No. 10-2021-7012718, dated Apr. 11, 2023, 22 pages including machine-generated English language translation.

Japanese Office Action from Japanese Patent Application No. 2023-083796, dated Aug. 5, 2024, 5 pages including English language translation.

* cited by examiner

MODULAR SYSTEM FOR HEAD-MOUNTED DEVICE

CROSS-REFERENCE TO RELATED APPLICATIONS

This application claims the benefit of U.S. Provisional Application No. 62/782,260, entitled "MODULAR SYSTEM FOR HEAD-MOUNTED DEVICE," filed Dec. 19, 2018, the entirety of which is incorporated herein by reference.

TECHNICAL FIELD

The present description relates generally to head-mounted devices, and, more particularly, to modular configurations for head-mounted devices.

BACKGROUND

A head-mounted device can be worn by a user to display visual information within the field of view of the user. The head-mounted device can be used as a virtual reality (VR) system, an augmented reality (AR) system, and/or a mixed reality (MR) system. A user may observe outputs provided by the head-mounted device, such as visual information provided on a display. The display can optionally allow a user to observe an environment outside of the head-mounted device. Other outputs provided by the head-mounted device can include audio output and/or haptic feedback. A user may further interact with the head-mounted device by providing inputs for processing by one or more components of the head-mounted device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
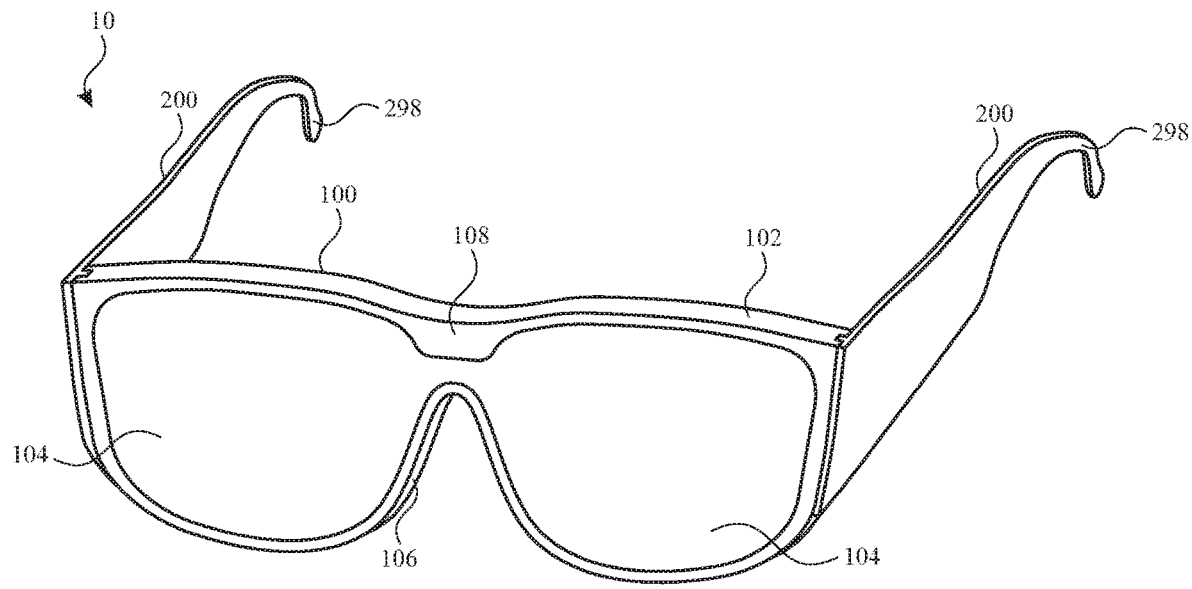
FIG. 1 illustrates a perspective view of a head-mounted device in an assembled configuration, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mounted devices, such as head-mounted displays, headsets, visors, smartglasses, head-up display, etc., can perform a range of functions that is determined by the components (e.g., sensors, circuitry, and other hardware) included with the wearable device as manufactured. However, space, cost, and other considerations may limit the ability to provide every component that might provide a desired function. For example, different users may have different preferences regarding the components and functions that are provided by a given head-mounted device. Some users may desire certain capabilities, such as high resolution display and long battery life, while other users may desire other capabilities, such as smaller form factor. Furthermore, a given user may desire different functions at different times. For example, a given user may desire high resolution display at home and long battery life when outside the home.

Given the diversity of desired components and functions, it would be beneficial to allow a user to modify components and functions of a head-mounted device to customize the user experience according to the user's desires. Head-mounted devices of the present disclosure facilitate customization, adaptability, and modification by a user according to the user's desires.

Systems of the present disclosure can provide a head-mounted device with exchangeable modules that provide a variety of different components and functions to achieve the results that are desired by a user. The modular configurations allow a user to easily customize a head-mounted device with one or more arm modules to provide features that integrate with other operations of the frame module of the head-mounted device. The arm modules can be easily exchanged with each other to provide different components and functions at different times. Accordingly, a frame module of the present disclosure need not include permanent components that provide every function that will later be desired by the user. Instead, the head-mounted device can have expanded and customizable capabilities by the use of one or more arm modules.

These and other embodiments are discussed below with reference to FIGS. 1-18. However, those skilled in the art will readily appreciate that the detailed description given herein with respect to these Figures is for explanatory purposes only and should not be construed as limiting.

According to some embodiments, for example as shown in FIG. 1, a head-mounted device 10 includes a frame module 100 that is worn on a head with one or more arm modules 200. The frame module 100 can be positioned in front of the eyes of a user to provide information within a field of view of the user. The frame module 100 can include a frame 102 that provides nose pads 106 or another feature to rest on a user's nose. The frame 102 further includes one or more display elements 104 and a bridge 108 above the nose pads 106 and connecting multiple display elements 104.

The frame 102 can serve to surround a peripheral region of the frame module 100 as well as support any internal components of the frame module 100 in their assembled position. For example, the frame 102 can enclose and support various internal components (including for example integrated circuit chips, processors, memory devices and other circuitry) to provide computing and functional operations for the head-mounted device 10, as discussed further herein.

A display element 104 can transmit light from a physical environment for viewing by the user. Such a display element 104 can include optical properties, such lenses for vision correction based on incoming light from the physical environment. Additionally or alternatively, a display element 104 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring again to FIG. 1, a frame module 100 can be supported on a user's head with arm modules 200. The arm modules 200 can wrap or extend along opposing sides of a user's head, as with a temple component. The arm modules 200 can further include earpieces 298 for wrapping around or otherwise engaging a user's ears. It will be appreciated that other configurations can be applied for securing the head-mounted device 10 to a user's head. For example, one or more bands, straps, belts, caps, hats, or other components can be used in addition to or in place of the illustrated components of the head-mounted device 10. By further example, an arm module can extend about a user's head to both sides of the frame module 100.

Figure 2:
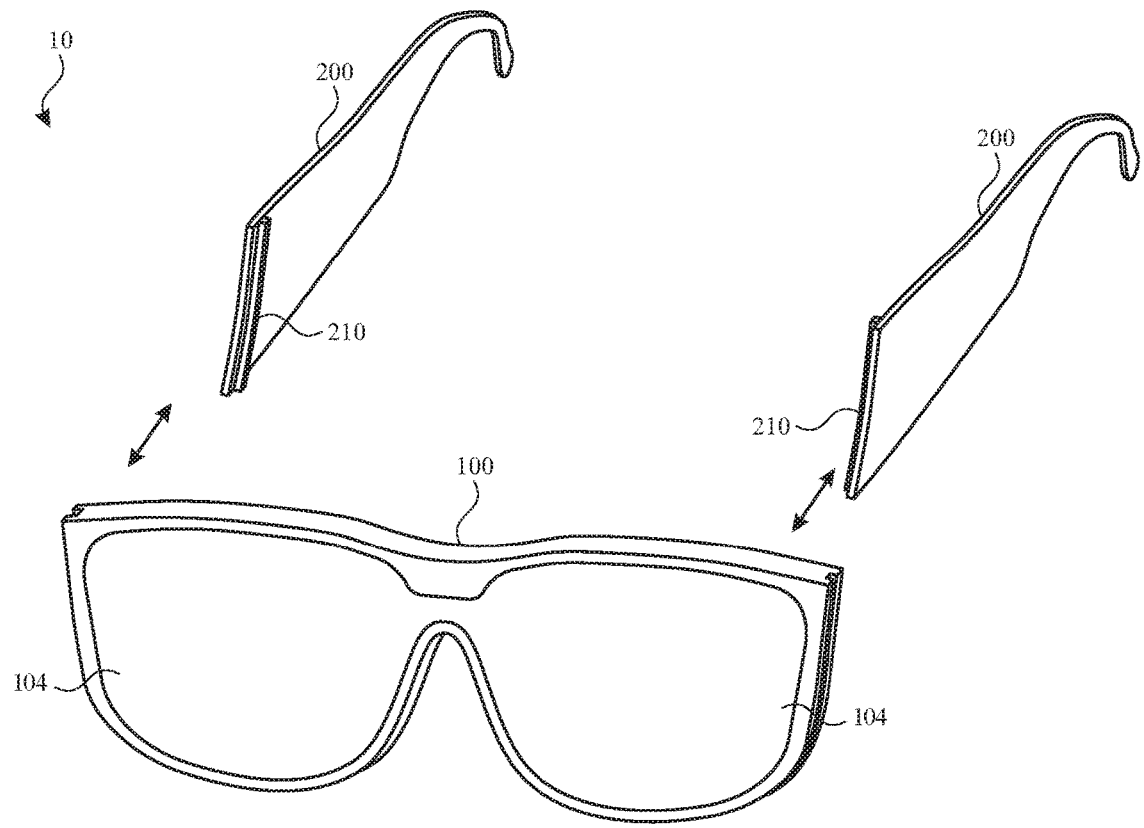
FIG. 2 illustrates a perspective view of a head-mounted device in an unassembled configuration, in accordance with some embodiments of the present disclosure.

Referring to FIG. 2, systems of the present disclosure provide a head-mounted device with exchangeable modules that provide a variety of different components and functions to achieve the results that are desired by a user. For example, a head-mounted device 10 can be provided with arm modules 200 that can be detached from the frame module 100. Frame attachment elements 110 of the frame module 100 can interact with arm attachment elements 210 of the arm modules 200 to provide a secure and reversible coupling. The modular configurations allow a user to easily customize a head-mounted device with one or more arm modules to provide features that integrate with other operations of the frame module of the head-mounted device. The arm modules 200 can be easily exchanged with each other to provide different components and functions at different times.

As used herein, "modular" or "module" can refer to a characteristic that allows an item, such as an arm module, to be connected, installed, removed, swapped, and/or exchanged by a user in conjunction with another item, such as a frame module of a head-mounted device. Connection of an arm module with a frame module can be performed and reversed, followed by disconnection and connection of another arm module with the same frame module or another frame module with the same arm module. As such, multiple arm modules can be exchangeable with each other with respect to a given frame module. Further, multiple frame modules can be exchangeable with each other with respect to a given arm module.

An arm module can be connected to a frame module in a manner that allows the arm module to be removed thereafter. The connection can be fully reversible, such that when the arm module and the frame module are disconnected, each is restored to a condition held prior to the connection. The connection can be fully repeatable, such that after the arm module and the frame module are disconnected, the same or a different frame module and arm module pair can be connected in the same way. The arm module and frame module can be securely and temporarily connected, rather than permanently, fixedly, or resiliently connected (e.g., via chemical and/or molecular bond). For example, connection and disconnection of the arm module and frame module are facilitated in a manner that does not cause permanent damage, harm, or deformation to the arm module or the frame module.

An arm module can be connected to and disconnected from a frame module with ease by a user. The connection and/or disconnection can be achieved repeatedly and reversibly by hand, rather than requiring a tool. For example, a locking mechanism and/or a release mechanism can be provided on the arm module and/or the frame module for ready access by a user. A force required by a user to connect and/or disconnect the arm module and the frame module can be within a typical range for a user's fingers. For example, a force required to connect and/or disconnect the arm module and the frame module can be less than 1 N, 5 N, 10 N, 15 N, 20 N, 25 N, or 30 N. Additionally or alternatively, connection and/or disconnection can be achieved and/or facilitated by use of a tool.

An arm module and a frame module can be connected in a manner that secures the relative positions of the arm module and the frame module with respect to each other. The arm module and the frame module can be connected in a manner that provides a communication link there between. The secured positions and the communication link can both be achieved and maintained upon connection of the arm module and the frame module. The secured positions and the communication link can both be removed upon disconnection of the arm module from the frame module.

While different arm modules can provide different features and/or functions, multiple arm modules can be exchangeable with each other by providing at least some features that are similar or the same among the multiple arm modules. For example, different arm modules can be secured to a given frame module by the same securement mechanism. By further example, different arm modules can establish a communication link with the given frame module via the same communication mechanism. Accordingly, a frame module can accommodate the exchange of different arm modules by providing the same securement mechanism and communication mechanism across the different arm modules. Likewise, an arm module can accommodate the exchange of different frame modules by providing the same securement mechanism and communication mechanism across the different frame modules.

Multiple arm modules can have other features that are similar or the same among the multiple arm modules. For example, the multiple arm modules can include enclosures that have the same or similar size, shape, profile, dimension, aspect ratio, surface feature, texture, color, and/or markings. The common features allow a user to exchange the arm modules with each other while maintaining a consistent user experience across the different arm modules when used at different times.

Additionally or alternatively, at least one of the size, shape, profile, dimension, aspect ratio, surface feature, texture, color, and/or markings can be different among multiple arm modules. For example, different arm modules can have different sizes and/or shapes to accommodate different head and/or face structures. This can allow a user to choose from among multiple arm modules that provide different ergonomic features so the user can select one according to comfort provided. By further example, different arm modules can have different aesthetic features to provide the user with different options for fashion and appearance.

Additionally or alternatively, at least one of the size, shape, profile, dimension, aspect ratio, surface feature, texture, color, and/or markings can be different among multiple frame modules. For example, different frame modules can have different sizes and/or shapes to accommodate different head and/or face structures. This can allow a user to choose from among multiple frame modules that provide different ergonomic features so the user can select one according to comfort provided. By further example, different frame modules can provide different functional features, such as different lenses for vision correction, so that a user can select a frame module that is appropriate for a given activity (e.g., driving, reading, etc.). By further example, different frame modules can have different aesthetic features to provide the user with different options for fashion and appearance.

Figure 3:
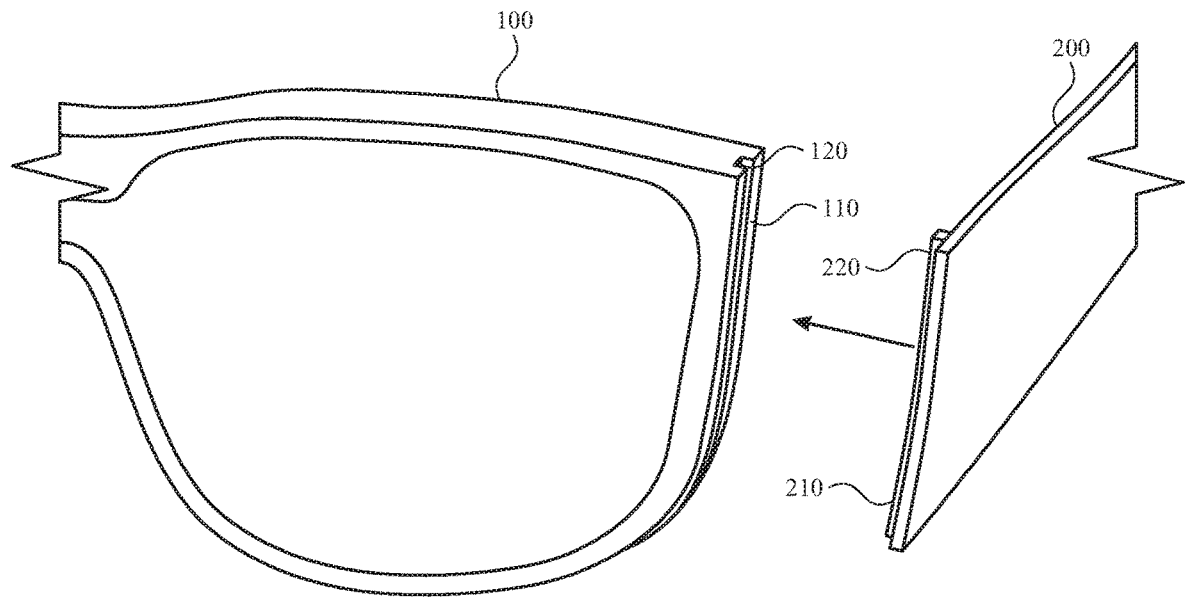
FIG. 3 illustrates a perspective view of a portion of a head-mounted device in an unassembled configuration, in accordance with some embodiments of the present disclosure.

FIG. 3 illustrates a perspective view of a frame module and an arm module each having a mechanical attachment mechanism and a communication link, in accordance with some embodiments of the present disclosure. While only one arm module is shown in FIG. 3, it will be understood that the description herein can apply to each of multiple arm modules.

As shown in FIG. 3, the arm module 200 can attach to the frame module 100 of the head-mounted device 10 with the frame attachment elements 110 and the arm attachment elements 210. For example, the frame attachment elements 110 and the arm attachment elements 210 can mechanically engage each other for securement of the arm module 200 to the frame module 100. The frame attachment elements 110 and the arm attachment elements 210 can have complementary shapes to facilitate engagement. For example, the frame attachment elements 110 and/or the arm attachment elements 210 can form a protrusion and the arm attachment elements 210 and/or the frame attachment elements 110 can form a groove. The groove can have a shape and/or size that complement the shape and/or size of the frame attachment elements 110. It will be understood that a variety of shapes and/or sizes can be provided to achieve the engagement between the frame attachment elements 110 and the arm attachment elements 210. It will be further understood that any number of frame attachment elements 110 and arm attachment elements 210 can be provided. While certain mechanical attachment mechanisms are depicted, it will be understood that other mechanical attachment mechanisms are also contemplated.

The frame attachment elements 110 and the arm attachment elements 210 can provide a rotational engagement so that the arm modules 200 are able to pivot with respect to the frame module 100. This provides a collapsed configuration in which the arm modules 200 are closer to the frame module 100 for storage while not in use. Such an attachment can be provided by a mechanical hinge or magnetic coupling that allows relative rotational movement.

Figure 4:
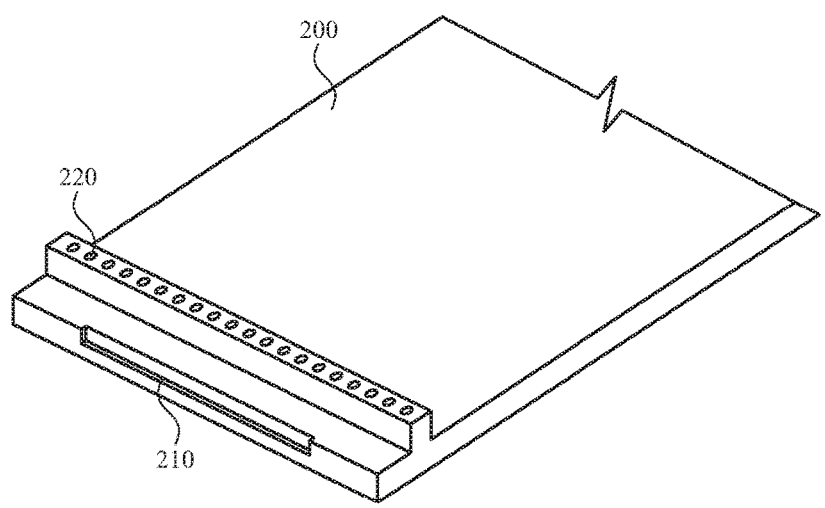
FIG. 4 illustrates a perspective view of a portion of an arm module of a head-mounted device, in accordance with some embodiments of the present disclosure.

As further shown in FIGS. 3 and 4, the frame module 100 can be provided with a frame communication interface 120 and the arm module 200 can be provide with an arm communication interface 220. The communication interfaces 120 and 220 can include pairs of conductive contact that are configures to make electrical contact when the frame attachment element 110 and the arm attachment element 210 are engaged with each other. For example, one or more of the communication interfaces 120 and 220 can include a moveable element for making an electrical connection, such as a pogo pin that is at least partially collapsible and/or a contact pad that is at least partially flexible. By further example, a pogo pin can be spring loaded and/or a contact pad can be formed from an electrically conductive foam or elastomer.

Additionally or alternatively, the communication interfaces 120 and 220 can include connectors that are manually connected to establish a communication interface apart from the mechanical attachment with the attachment elements 110 and 210. Such connectors can include ZIF connectors, non-ZIF connectors, slider connectors, flip actuator connectors, and/or FPC-to-Board connectors. Additionally or alternatively, the frame communication interface 120 and/or the arm communication interface 220 can provide direct (e.g., board-to-board) connection between controllers of the frame module 100 and the arm module 200.

Additionally or alternatively, the communication interfaces 120 and 220 can form waveguides for conducting light between the frame module and the arm module. For example, such waveguides can allow light generated in the arm module to be directed to the display element of the frame module for viewing by the user.

It will be understood that a variety of other communication links can be provided between the frame communication interface 120 and the arm communication interface 220. No direct contact may be required to establish a communication link. For example, a communication link between the frame communication interface 120 and the arm communication interface can include wireless interfaces, Bluetooth interfaces, Near Field Communication interfaces, magnetic interfaces, inductive interfaces, resonant interfaces, capacitive coupling interfaces, Wi-Fi interfaces, optical interfaces, acoustic interfaces, and/or other communication interfaces.

Figure 5:
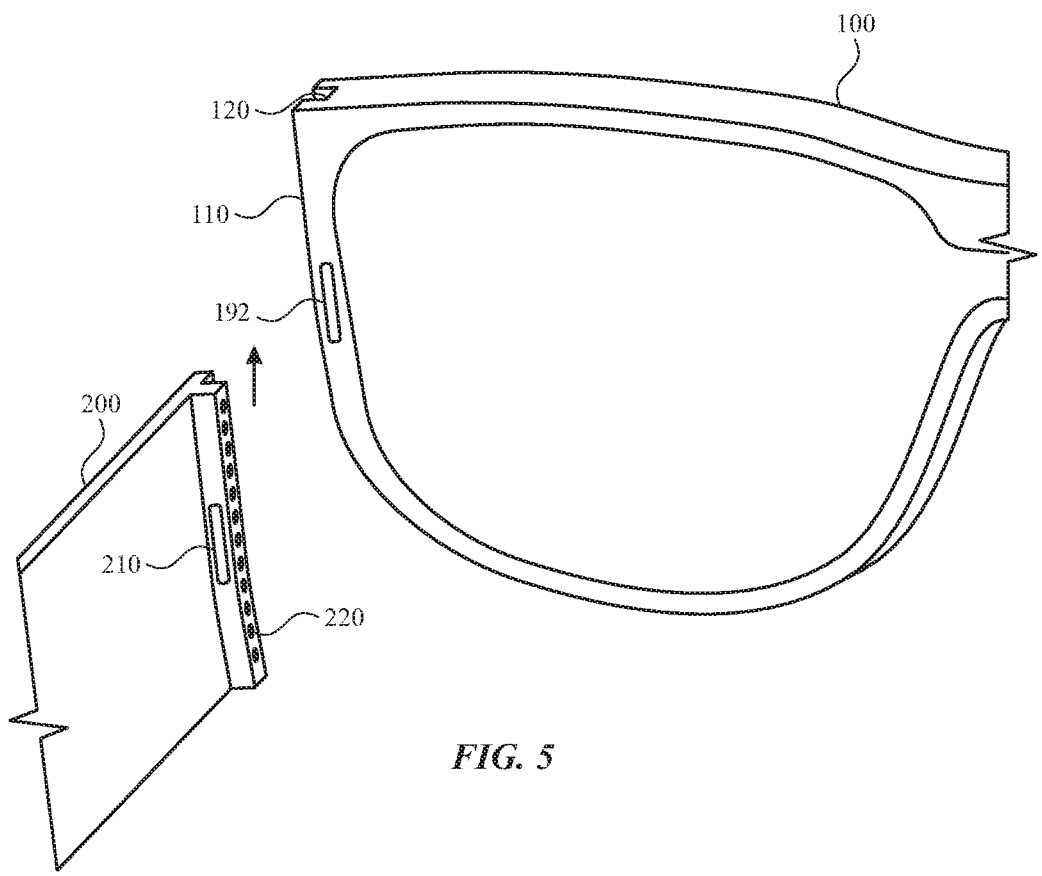
FIG. 5 illustrates a perspective view of portions of a head-mounted device in an unassembled configuration, in accordance with some embodiments of the present disclosure.
Figure 6:
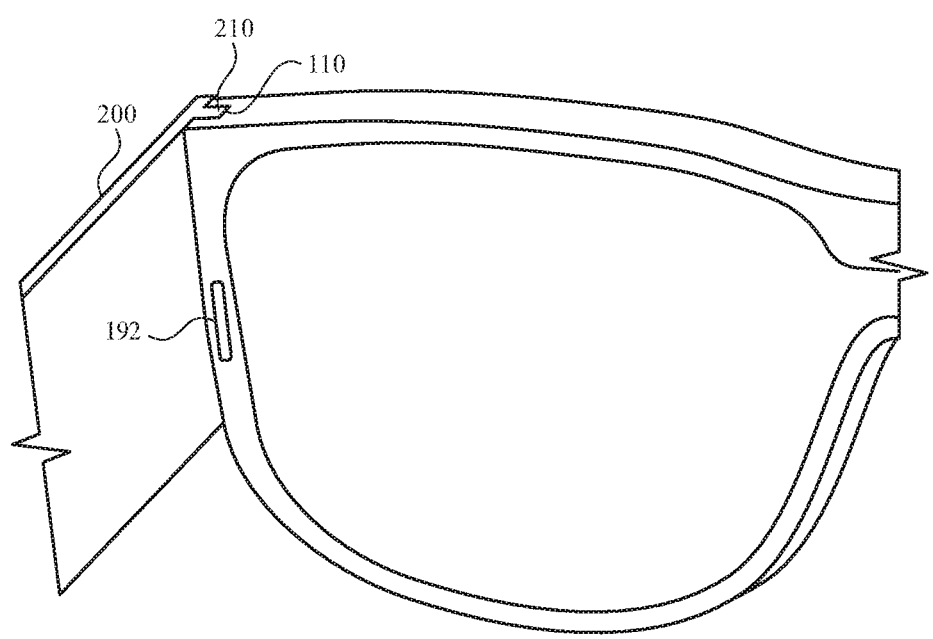
FIG. 6 illustrates a perspective view of portions of a head-mounted device in an assembled configuration, according to some embodiments of the present disclosure.

FIGS. 5 and 6 illustrate perspective views of an example of mechanical and communication connections. While only one arm module is shown in FIGS. 5 and 6, it will be understood that the description herein can apply to each of multiple arm modules.

As shown in FIG. 5, the arm attachment element 210 of the arm module 200 can be laterally or otherwise inserted into the frame attachment element 110 of the frame module 100. As such, the arm module 200 can be configured to slide relative to the frame module 100. Additionally or alternatively, the arm attachment element 210 can be pressed, snap fit or otherwise forwardly inserted into the frame attachment element 110. Once inserted, the arm attachment element 210 can be locked or otherwise secured within the frame attachment element 110. An electrical connection can be made and maintained upon mechanical securement of the frame attachment element 110 and the arm attachment element 210, for example via the frame communication interface 120 and the arm communication interface 220. When the frame module 100 is connected to the arm module 200, components thereof can be in operative communication.

Additional or alternative mechanisms can be provided to lock the arm module 200 in place with respect to the frame module 100. For example, mechanisms such as locks, latches, snaps, screws, clasps, threads, magnets, pins, an interference (e.g., friction) fit, knurl presses, bayoneting, and/or combinations thereof can be included to lock the arm module 200 to the frame module 100 when the frame attachment elements 110 and the arm attachment elements 210 engage each other. The arm module 200 can remain locked from sliding with respect to the frame module 100 until a release mechanism 192 is actuated. The release mechanism 192 can be provided on an outer surface of the head-mounted device 10 for access by a user. For example, the release mechanism 192 can be provided on an outer surface of the frame module 100 and/or the arm module 200.

Where a locking mechanism locks the arm module 200 in place with respect to the frame module 100, the release mechanism 192, when actuated, can move and act upon the locking mechanism to cause it to release. For example, the release mechanism 192, when actuated, can release one or more locks, latches, snaps, screws, clasps, threads, magnets, pins, an interference (e.g., friction) fit, knurl presses, bayoneting, and/or combinations thereof that were previously locking the arm module 200 to the frame module 100. At least some of the interactions between the release mechanism 192 and a locking mechanism can be within the frame module 100 and/or the arm module 200.

Figure 7:
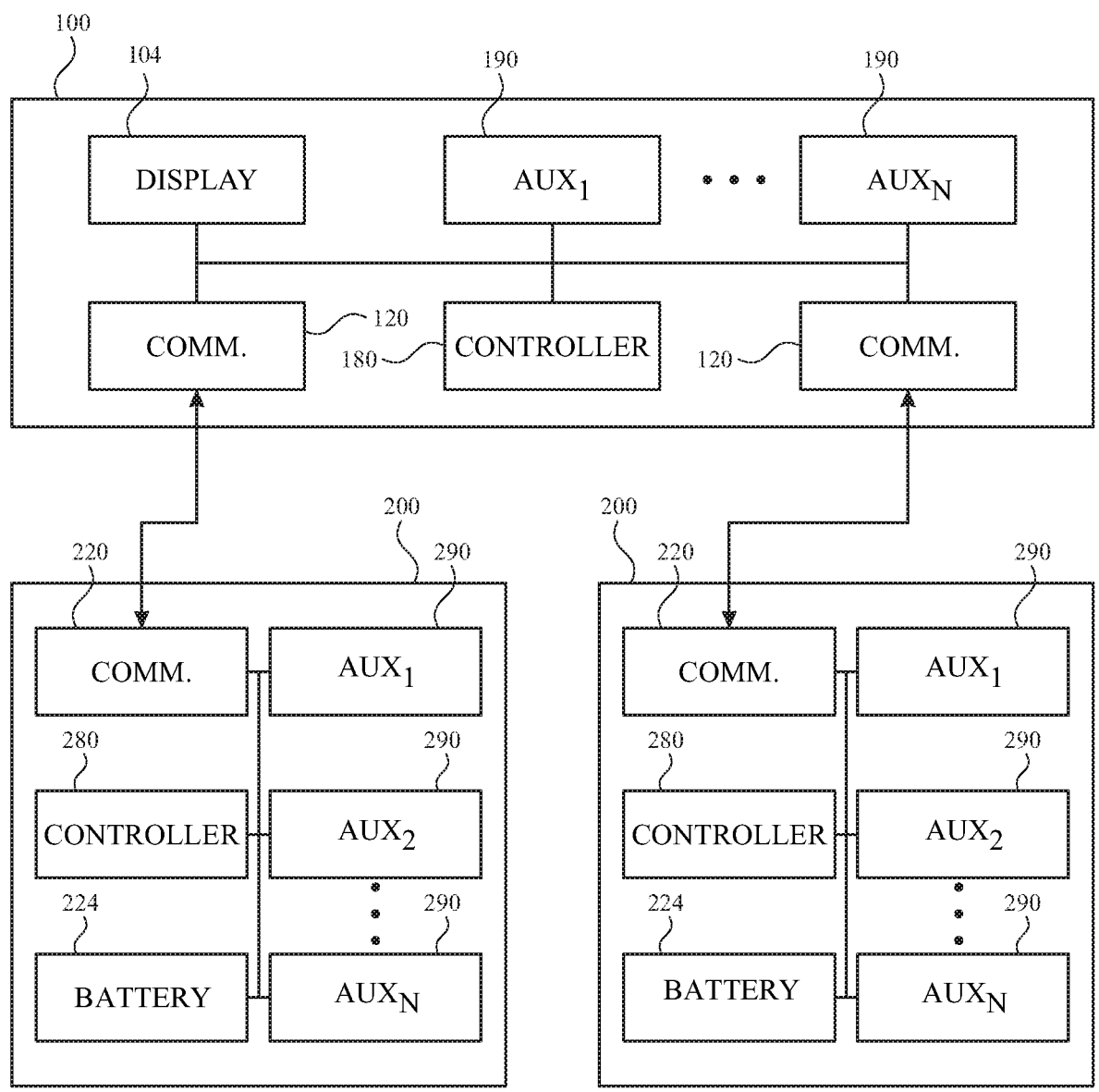
FIG. 7 illustrates a block diagram of a head-mounted device having a frame module and two arm modules, in accordance with some embodiments of the present disclosure.

FIG. 7 illustrates a block diagram of a frame module and an arm module, in accordance with some embodiments of the present disclosure. It will be appreciated that components described herein can be provided on either or both of a frame module and/or an arm module. In some embodiments, components are provided by an arm module instead of a frame module to reduce redundancy and increase customization based on a selection of arm modules.

As shown in FIG. 7, the frame module 100 can include a controller 180 with one or more processing units that include or are configured to access a memory having instructions stored thereon. The instructions or computer programs may be configured to perform one or more of the operations or functions described with respect to the frame module 100. The controller 180 can be implemented as any electronic device capable of processing, receiving, or transmitting data or instructions. For example, the controller 180 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the frame module 100. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

The frame module 100 can further include a display element 104 for displaying visual information for a user. The display element 104 can provide visual (e.g., image or video) output. The display element 104 can be or include an opaque, transparent, and/or translucent display. A transparent or translucent display element 104 may have a medium through which light representative of images is directed to a user's eyes. The display element 104 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The frame module 100 can further include any number of auxiliary frame electronic components 190. Examples of auxiliary frame electronic components 190 include interfaces for receiving input from and/or providing output to a user. Examples of such interfaces include a speaker, a microphone, a haptic device, and/or another I/O component. For example, a speaker (e.g., earpiece) can be provided by or connectable to a frame module and/or an arm module. Such a speaker component can be a modular component that can operate independently of and/or in concert with the head-mounted device. The speaker component can wirelessly communication with the head-mounted device and/or another device. The speaker component can transfer power to and/or receive power from the head-mounted device and/or another device. Such power transfer can be wired and/or wireless.

A haptic device can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock. Examples of other user interfaces include one or more buttons, dials, crowns, switches, or other devices can be provided for receiving input from a user. An auxiliary frame electronic component 190 can include an additional display and/or a projector for displaying an image on a surface other than on the head-mounted device.

Further examples of auxiliary frame electronic components 190 include sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics.

Further examples of auxiliary frame electronic components 190 include power sources and/or power transmission components to recharge a power source. Further examples of auxiliary frame electronic components 190 include a communication component that facilitates transmission of data and/or power to or from other electronic devices across standardized or proprietary protocols.

As further shown in FIG. 7, the arm module 200 includes components to perform selected functions and to interact with the frame module 100. While the arm modules 200 of FIG. 7 are illustrated as being substantially similar, it will be understood that separate arm modules 200 can be provided simultaneously with different features.

The frame module 100 can include the frame communication interface 120, and the arm modules 200 can each include the arm communication interface 220 to facilitate a communication link between the frame module 100 and the arm modules 200. For example, the communication link can operably connect components of the frame module 100, such as the controller 180) to components of the arm modules 200.

Each arm module 200 can include a controller 280 with one or more processing units that include or are configured to access a memory having instructions stored thereon. The controller 280 and/or the memory of the arm module 200 can be the same as, similar to, or different than the controller 180 and/or the memory of the frame module 100.

The frame module 100 can be controlled at least in part by the controller 280 of an arm module 200. For example, while the arm module 200 is connected to the frame module 100, the controller 280 of an arm module 200 can operably connect to and/or control one or more components of the frame module 100 via the communication link provided by the frame communication interface 120 and the arm communication interface 220.

Additionally or alternatively, each arm module 200 can be controlled at least in part by the controller 180 of the frame module 100. For example, while the arm module 200 is connected to the frame module 100, the controller 180 of the frame module 100 can operably connect to and/or control one or more components of the arm module 200 via the communication link provided by the frame communication interface 120 and the arm communication interface 220.

The arm module 200 can operate as a power source for the frame module 100. By providing power with a removable module, the user can select such an arm module according to anticipated power needs. As shown in FIG. 7, each arm module 200 can include a battery 224 that is used to store and provide power to the frame module 100 and/or the arm module 200. Optionally, the arm module 200 can recharge a battery of the frame module 100, for example, by directing power from the battery 224 across the frame communication interface 120 and the arm communication interface 220. Other pathways are contemplated, such as another link or wireless charging. The battery 224 can be a replaceable battery, a rechargeable battery, or a tethered power source that receives power from a source external to the arm module 200, such as from a USB cable, Lightening cable, or other interface. One or more batteries of the head-mounted device can transfer power to and/or receive power from another device. Such power transfer can be wired and/or wireless.

Each arm module 200 can further include any number of auxiliary arm electronic components 290. By providing electronic components on a removable module, the user can select an arm module providing selected functions when desired. At other times, other arm modules can be selected, thereby reducing the need to have all features available at all times in the frame module or in a fixed arm module. Each arm module can have the same or different auxiliary arm electronic components 290.

Examples of auxiliary arm electronic components 290 include display drivers. By providing display drivers with a removable module, the user can select such an arm module when certain display features are desired. Such display drivers can be configured to control the display element 104 of the frame module 100.

Further examples of auxiliary arm electronic components 290 include sensors. By providing sensing capabilities with a removable module, the user can select such an arm module when sensing particular conditions is desired. Such sensors can be configured to sense substantially any type of characteristic such as, but not limited to, images, pressure, light, touch, force, temperature, position, motion, and so on. For example, the sensor may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment. The sensor can be provided with exposure to the environment, for example with an opening in the arm module 200.

Further examples of auxiliary arm electronic components 290 include bio-sensors. By providing bio-sensing capabilities with a removable module, the user can select such an arm module when tracking biometric characteristics, such as health and activity metrics, is desired. The one or more bio-sensors can include optical and/or electronic biometric sensors that may be used to compute one or more biometric characteristics. For example, a bio-sensor can include a light source and a photodetector to form a photoplethysmography (PPG) sensor. An optical (e.g., PPG) sensor or sensors may be used to compute various biometric characteristic including, without limitation, a heart rate, a respiration rate, blood oxygenation level, a blood volume estimate, blood pressure, or a combination thereof. One or more of the bio-sensors may also be configured to perform an electrical measurement using one or more electrodes. The electrical sensor(s) may be used to measure electrocardiographic (ECG) characteristics, galvanic skin resistance, and other electrical properties of the user's body. Additionally or alternatively, a bio-sensor can be configured to measure body temperature, exposure to UV radiation, and other health-related information.

Further examples of auxiliary arm electronic components 290 include user sensors. Such sensors can be used to detect features relating to the user wearing the head-mounted device and/or other individuals. For example, user sensors can perform facial feature detection, facial movement detection, facial recognition, eye tracking, user mood detection, user emotion detection, voice detection, etc.

Further examples of auxiliary arm electronic components 290 include components for receiving input from a user, providing output to a user, and/or performing other functions. Examples of such components include a speaker, a microphone, a display, a touch sensor, a haptic device, a camera, an optical sensor, a magnet, a gyroscope, an accelerometer, and/or another I/O component. The I/O components can be used to detect and interpret user inputs. The I/O components can be used to provide information to the user. The I/O components can also be used to capture information relating to the user and/or the environment.

It will be understood that the components of either the frame module or arm modules discussed herein can be provided on either or both of the frame module and/or the arm module. Furthermore, selection of different modules provides a customized experience for a user.

Figure 8:
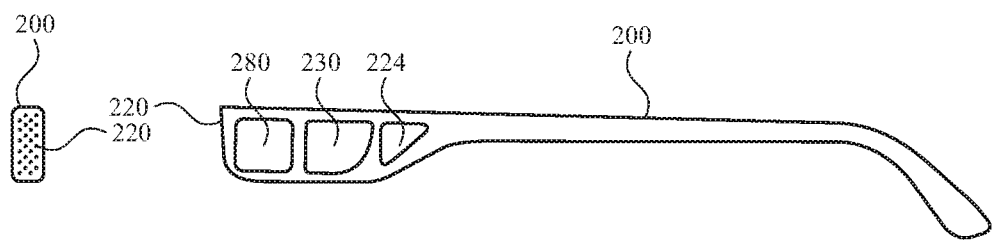
FIG. 8 illustrates front and side views of a first arm module of a head-mounted device, in accordance with some embodiments of the present disclosure.
Figure 9:
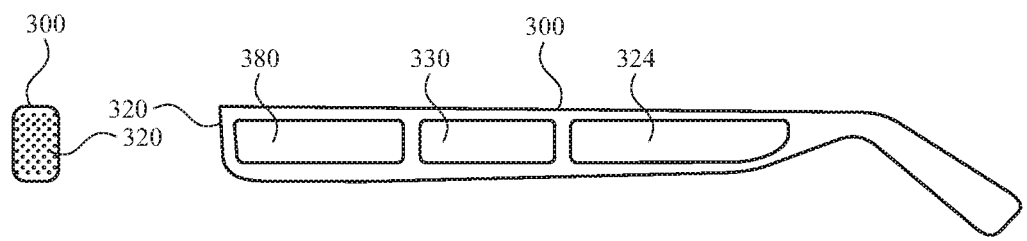
FIG. 9 illustrates front and side views of a second arm module of a head-mounted device, in accordance with some embodiments of the present disclosure.
Figure 10:
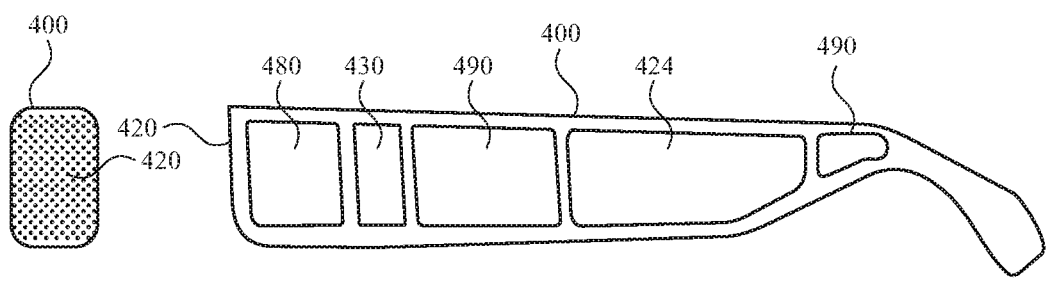
FIG. 10 illustrates front and side views of a third arm module of a head-mounted device, in accordance with some embodiments of the present disclosure.

Referring now to FIGS. 8-10, one or more of a variety of arm modules can be used at different times with a given frame module of a head-mounted device. FIGS. 8-10 illustrate front and side view of different arm modules for use with a frame module, in accordance with some embodiments of the present disclosure. While only one arm module is shown in each of FIGS. 8-10, it will be understood that the description herein can apply to each of multiple arm modules. Any number of frame modules and arm modules may be provided. Each of arm modules may be configured differently. For example, the functional aspects and the aesthetic aspects may be configured differently. Additional arm modules can also have the same or different components. The different components can provide different functions, as discussed further herein, so that attachment of a given arm module provides different functions to the same frame module of the head-mounted device. Each arm module can include one or more functional components such as sensors, bio-sensors, batteries, I/O components, communication interfaces, controllers, and the like, as discussed further herein.

As shown in FIG. 8, a first arm module 200 can include an arm communication interface 220 for communicating with a frame module. The arm module 200 can further include a controller 280, a display driver 230 configured to control a display element of a frame module, and a battery 224.

As shown in FIG. 9, a second arm module 300 can be provided with different and/or additional components with respect to the first arm module 200 of FIG. 8. For example, the second arm module 300 can include an arm communication interface 320 for communicating with a frame module. The arm communication interface 320 can include additional connections for managing greater communication bandwidth. The second arm module 300 can further include a controller 380, a display driver 330 configured to control a display element of a frame module, and a battery 324. The controller 380 can have greater processing capabilities than the controller 280 of the first arm module 200. The display driver 330 can have greater display capabilities (e.g., resolution, frame rate, etc.) than the display driver 230 of the first arm module 200. The battery 324 can have greater charge capacity than the battery 224 of the first arm module 200. The second arm module 300 can optionally include additional components (not shown) that are not included in the first arm module 200. As such, one or more of the components of the second arm module 300 can provide greater capabilities. It will be recognized that other features, such as size, shape, and other visual features may be provided by the second arm module 300 that are not provided by the first arm module 200. Accordingly, a user may select and install the second arm module 300 to provide selected functional and/or aesthetic features that are not provided by the first arm module 200.

As shown in FIG. 10, a third arm module 400 can be provided with different and/or additional components with respect to the first arm module 200 of FIG. 8 and/or the second arm module 300 of FIG. 9. For example, the third arm module 400 can include an arm communication interface 420 for communicating with a frame module. The arm communication interface 420 can include additional connections for managing greater communication bandwidth. The third arm module 400 can further include a controller 480, a display driver 430 configured to control a display element of a frame module, and a battery 424. The controller 480 can have greater processing capabilities than the controller 380 of the first arm module 200 and/or the controller 280 of the second arm module 300. The display driver 430 can have greater display capabilities (e.g., resolution, frame rate, etc.) than the display driver 230 of the first arm module 200 and/or the display driver 330 of the second arm module 300. The battery 424 can have greater charge capacity than the battery 224 of the first arm module 200 and/or the battery 324 of the second arm module 300. The third arm module 400 can optionally include auxiliary electronic components 490 that are not included in the first arm module 200 and/or the second arm module 300. As such, one or more of the components of the third arm module 400 can provide greater capabilities. It will be recognized that other features, such as size, shape, and other visual features may be provided by the third arm module 400 that are not provided by the first arm module 200 and/or the second arm module 300. Accordingly, a user may select and install the third arm module 400 to provide selected functional and/or aesthetic features that are not provided by the first arm module 200 and/or the second arm module 300.

It will be recognized that the difference in functionality between arm modules can refer to both the purpose of a component as well as the parameters of its operation. For example, while the components of different arm modules can both be for a common purpose, the components can operate differently to achieve the purpose. For example, different components can be for sensing different conditions based on the operations desired by a user. Other variations, such as size, shape, and material selection can be provided so the user can select the arm module that is best suited for the user's comfort and/or performance of the component.

The different arm modules can also differ in mechanical configuration such as material properties and/or structural features, which can help define shape, size, flexibility, rigidity, tactile feel, and/or aesthetic properties such as color, patterns, and/or materials to provide a different look and feel. Furthermore, each of the arm modules may have a different enclosure having a different color, material, shape, accoutrements, patterns, etc. The enclosures can provide different aesthetic features, cosmetic features, and/or a look and feel than the other enclosures in the system.

While the components of different arm modules can differ, the arm modules 200, 300, and 400 can have the same or similar arm communication interfaces 220, 320, and 420, so that each of the arm modules 200, 300, and 400 can attach to and communication with the same frame module 100 in the same or similar manner.

Accordingly, each arm module is configured to provide a different function and/or aesthetic feature than one or more other arm modules in the system. As such, the user can select the arm module with the desired functionality and/or look and feel. This may be at the time of purchase, thus allowing differentiation from other purchasers, or it may be that all or some portion of the arm modules come in a set such that the user can select the desired arm modules for the right moment. In one example, one arm module may be configured for use outside the home, while another may be configured for use at home. Any combination of aesthetic and functional features may be provided to create a different head-mounted device. When combined with the different frame modules, the system becomes highly customizable. The user can create a different head-mounted device by selecting one frame module to go along with one set of arm modules. If multiple systems are provided, any number of different head-mounted device configurations can be made.

Figure 11:
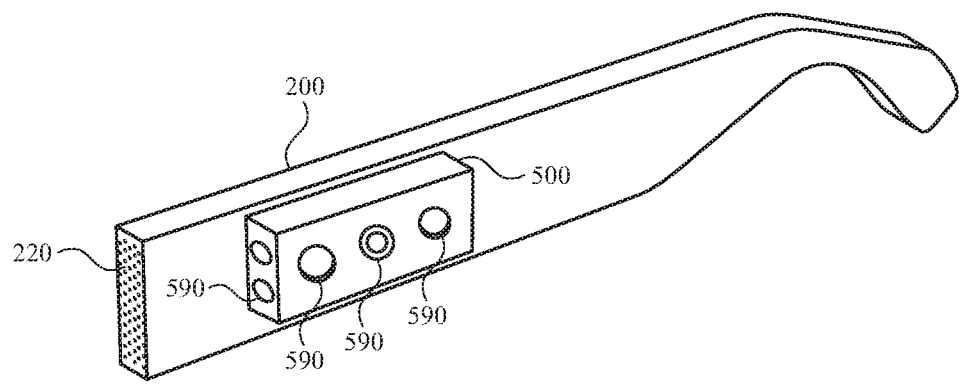
FIG. 11 illustrates a perspective view of an arm module and an additional module, in accordance with some embodiments of the present disclosure.
Figure 12:
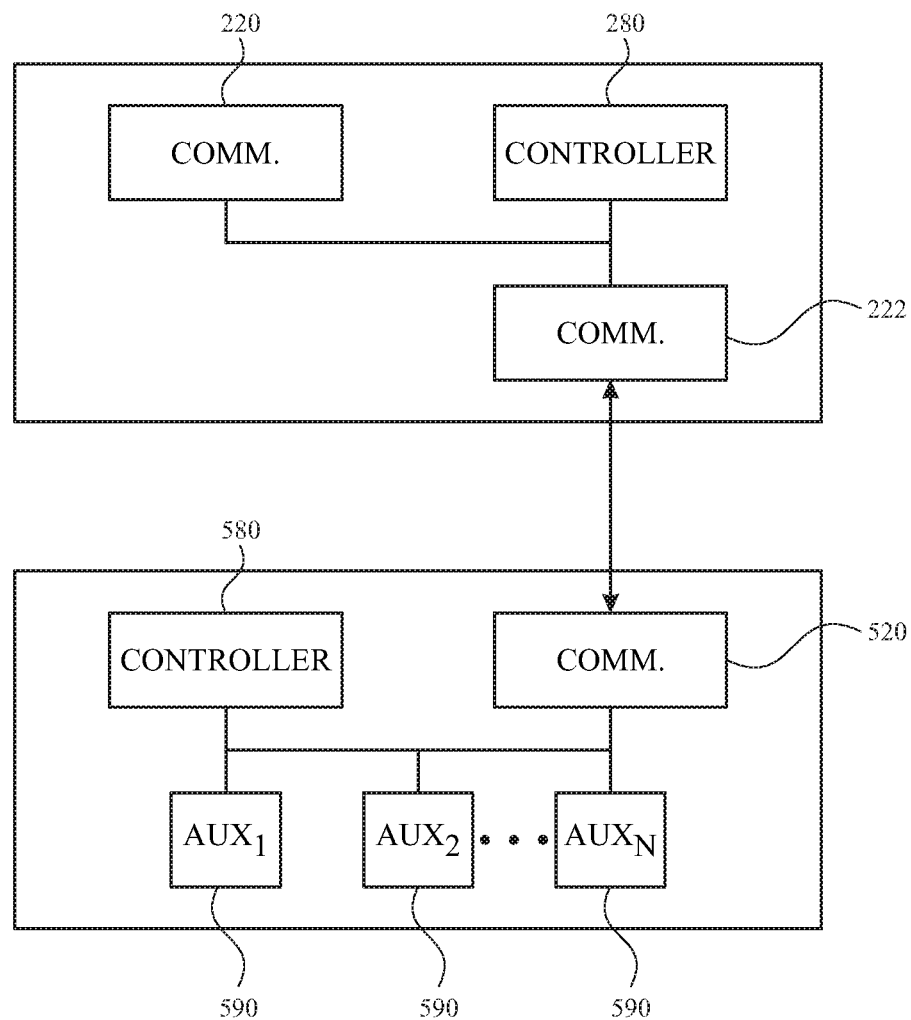
FIG. 12 illustrates a block diagram of an arm module and an additional module, in accordance with some embodiments of the present disclosure.

Referring now to FIGS. 11 and 12, an arm module can be provided with one or more additional modules for further enhancing functionality of the head-mounted device. For example, as shown in FIG. 11, an additional module 500 can be attached and operably connected to an arm module 200 independently of the attachment of the arm module 200 to a frame module. While only one arm module is shown in FIGS. 11 and 12, it will be understood that the description herein can apply to each of multiple arm modules.

The additional module 500 can be provided at any portion of the arm module 200. For example, the additional module 500 can be provided on an inner, outer, top, bottom, front, or rear side of the arm module 200. The additional module 500 can protrude from a surface of the arm module 200. As such, the arm module 200 can provide a continuous surface at its outer periphery while accepting the additional module 500 when desired by a user. In such a configuration, the additional module 500 can be effectively positioned to perform certain functions, such as directional sensing. For example, sensors mounted on the additional module can be oriented in directions to sense in a vicinity of the arm module 200. Alternatively, the additional module 500 can be inset within a recess of the arm module 200, such that a portion of the additional module 500 is flush with a portion of the arm module 200.

As shown in FIG. 12, the arm module 200 can include an additional arm communication interface 222 in addition to the arm communication interface 220 for communicating with the frame module. The additional module 500 can include an additional communication interface 520 for communicating with the arm module 200.

The additional module 500 can include a controller 580 with one or more processing units that include or are configured to access a memory having instructions stored thereon. The controller 580 and/or the memory of the additional module 500 can be the same as, similar to, or different than the controller 280 and/or the memory of the arm module 200.

The additional module 500 can further include any number of auxiliary additional electronic components 590. By providing electronic components on a removable module, the user can optionally provide the additional module 500 when selected functions are desired. At other times, other additional modules or no additional module can be selected, thereby reducing the need to have all features available at all times in the arm module 200. Examples of the auxiliary additional electronic components 590 include any electronic components discussed herein with respect to the auxiliary frame electronic components 190 and the auxiliary arm electronic components 290.

Figure 13:
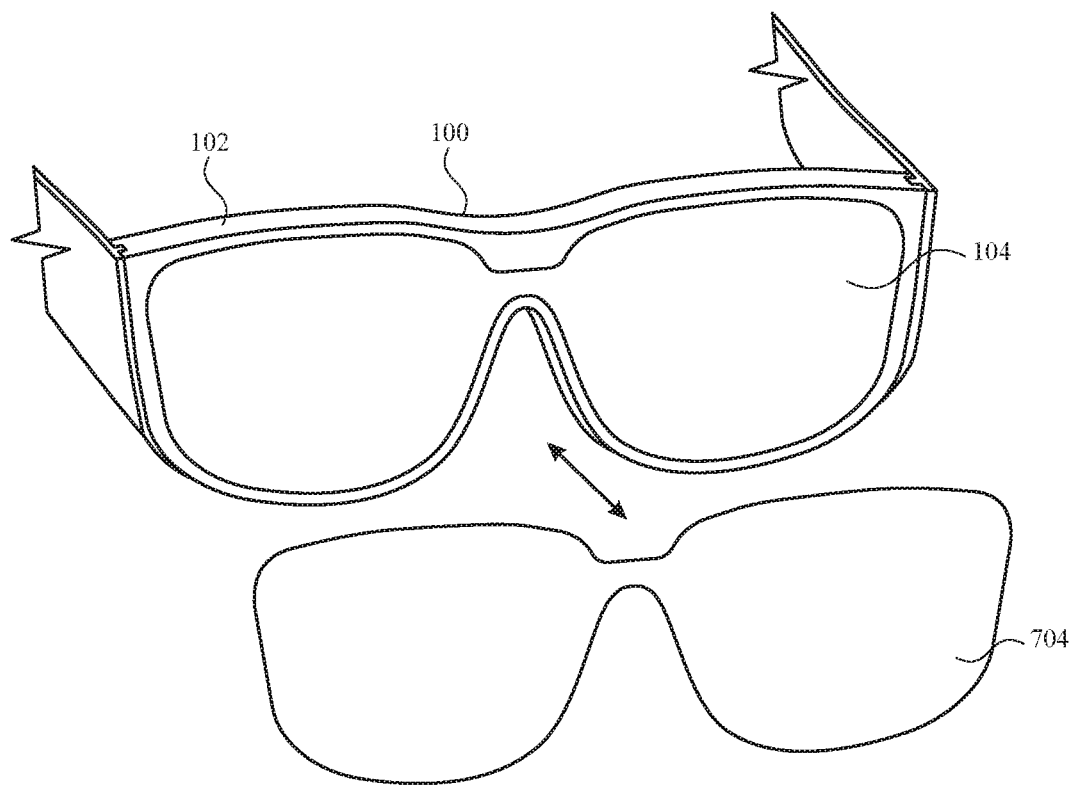
FIG. 13 illustrates a perspective view of a head-mounted device with an exchangeable display element, in accordance with some embodiments of the present disclosure.
Figure 14:
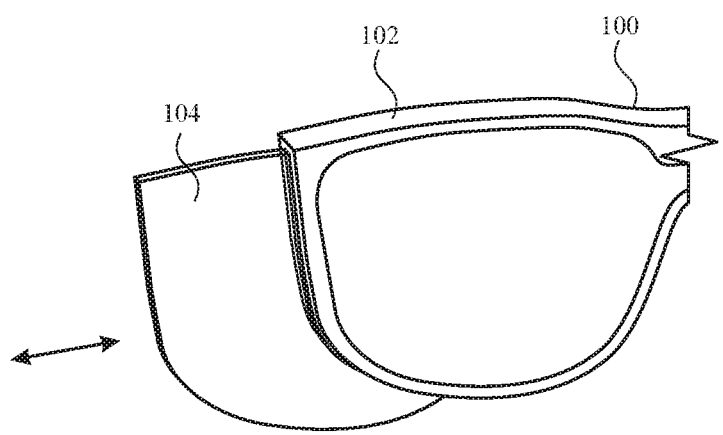
FIG. 14 illustrates a perspective view of a frame module of a head-mounted device with an exchangeable display element, in accordance with some embodiments of the present disclosure.

Referring now to FIGS. 13 and 14, a frame module can be provided with exchangeable display elements. For example, as shown in FIG. 13, a display element 104 in one configuration can be exchanged with an additional display element 704 having at least one different feature (e.g., resolution, color, thickness, etc.). For example, one of the display elements can be opaque and the other can be transparent or translucent. Additionally or alternatively, one display element can provide display capabilities over one eye and the other display element can provide display capabilities over only one eye or over neither eye. Additionally or alternatively, one display element can provide optical correction and the other display element can provide different or no optical correction.

As shown in FIG. 14, a display element 104 can be configured to slide relative to the frame module 100. Additionally or alternatively, the display element 104 can be pressed, snap fit or otherwise forwardly inserted into the frame 120 of the frame module 100. Once inserted, the display element 104 can be locked or otherwise secured within the frame 120. An electrical connection can be made and maintained upon mechanical securement of the display element 104.

Figure 15:
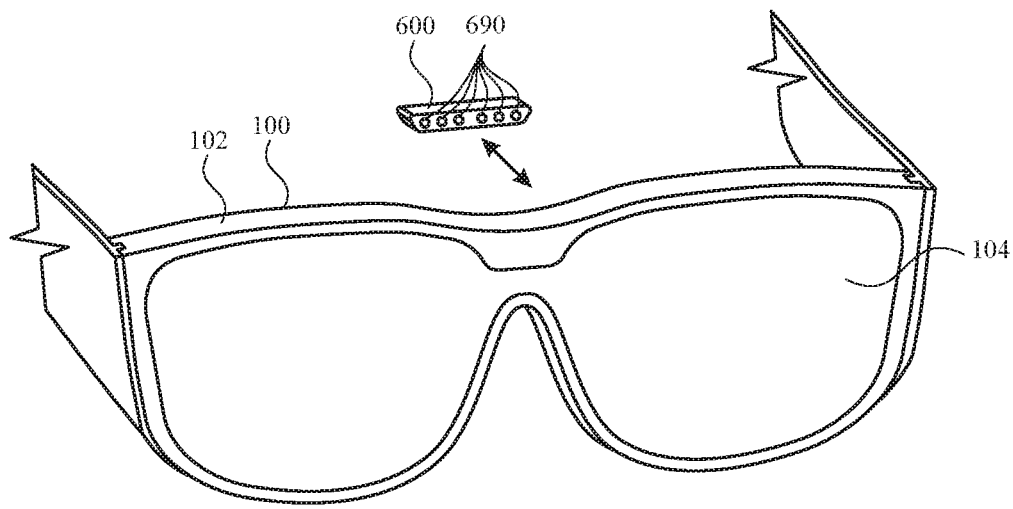
FIG. 15 illustrates a perspective view of a frame module and an additional module, in accordance with some embodiments of the present disclosure.
Figure 16:
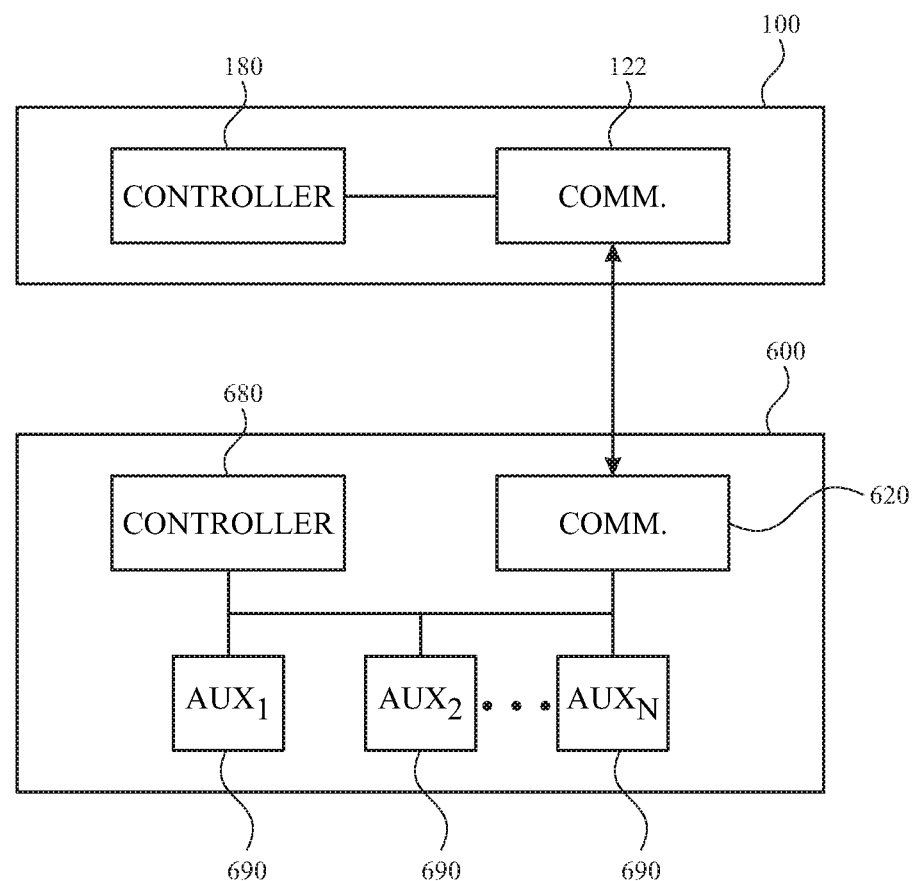
FIG. 16 illustrates a block diagram of a frame module and an additional module, in accordance with some embodiments of the present disclosure.

Referring now to FIGS. 15 and 16, a frame module can be provided with one or more additional modules for further enhancing functionality of the head-mounted device. For example, as shown in FIG. 15, an additional module 600 can be attached and operably connected to a frame module 100 independently of the attachment of the frame module 100 to an arm module.

The additional module 600 can be provided at any portion of the frame module 100. For example, the additional module 600 can be provided on an inner, outer, top, bottom, front, or rear side of the frame module 100. The additional module 600 can protrude from a surface of the frame module 100. As such, the frame module 100 can provide a continuous surface at its outer periphery while accepting the additional module 600 when desired by a user. In such a configuration, the additional module 600 can be effectively positioned to perform certain functions, such as directional sensing. For example, sensors mounted on the additional module can be oriented in directions to sense in a vicinity of the frame module 100. Alternatively, the additional module 600 can be inset within a recess of the frame module 100, such that a portion of the additional module 600 is flush with a portion of the frame module 100.

As shown in FIG. 16, the frame module 100 can include an additional frame communication interface 122 in addition to the frame communication interface for communicating with any arm modules. The additional module 600 can include an additional communication interface 620 for communicating with the frame module 100.

The additional module 600 can include a controller 680 with one or more processing units that include or are configured to access a memory having instructions stored thereon. The controller 680 and/or the memory of the additional module 600 can be the same as, similar to, or different than the controller 180 and/or the memory of the frame module 100.

The additional module 600 can further include any number of auxiliary additional electronic components 690. By providing electronic components on a removable module, the user can optionally provide the additional module 600 when selected functions are desired. At other times, other additional modules or no additional module can be selected, thereby reducing the need to have all features available at all times in the frame module 100. Examples of the auxiliary additional electronic components 690 include any electronic components discussed herein with respect to the auxiliary frame electronic components 190 and the auxiliary arm electronic components 290.

Figure 17:
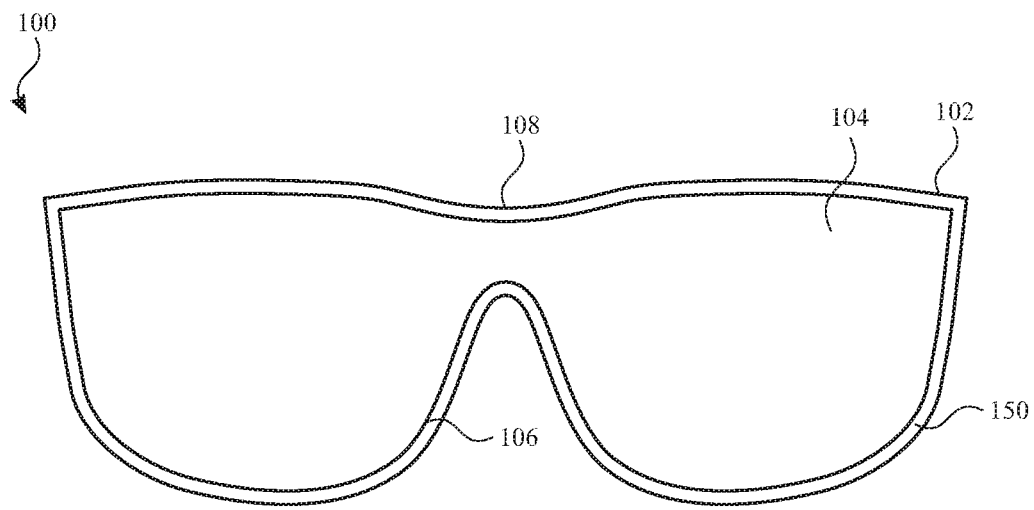
FIG. 17 illustrates a rear view of a frame module with a first support member, in accordance with some embodiments of the present disclosure.
Figure 18:
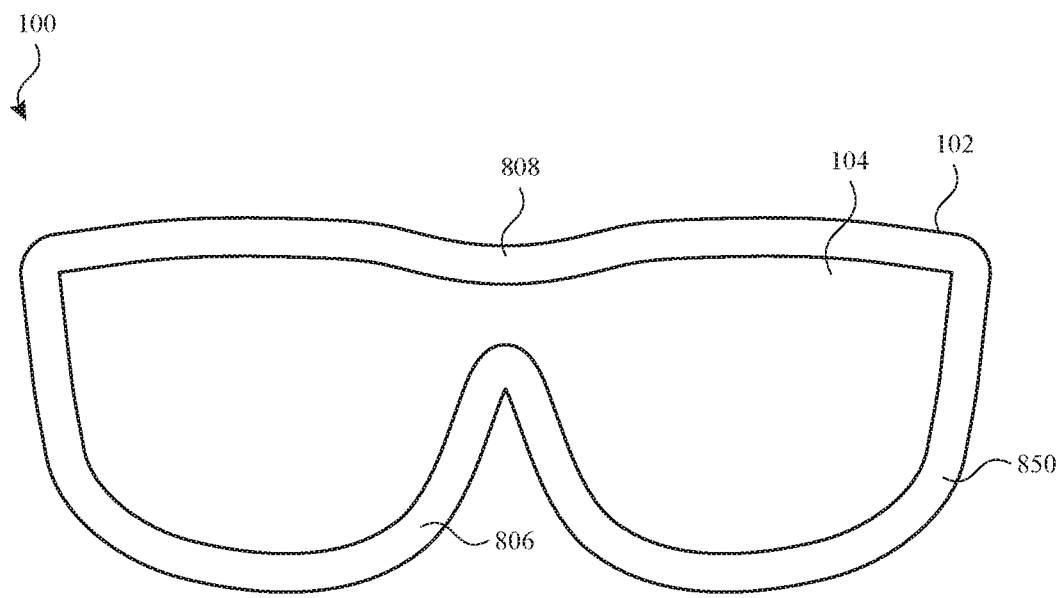
FIG. 18 illustrates a rear view of a frame module with a second support member, in accordance with some embodiments of the present disclosure.

Referring now to FIGS. 17 and 18, a frame module can be provided with exchangeable user engagement portions. For example, as shown in FIG. 17, a user engagement portion 150 in one configuration can be provided for use. The user engagement portion 150 can include or be coupled to the frame 102 and optionally extend across the bridge 108 and/or the nose pads 106 of the frame module 100. The user engagement portion 150 can leave exposed at least a portion of the display element 104 for viewing.

As shown in FIG. 18, in another configuration, an additional user engagement portion 850 is provided. The additional user engagement portion 850 can have different features with respect to the user engagement portion 150. For example, the additional user engagement portion 850 can provide a greater degree of engagement with the face of the user. By further example, the additional user engagement portion 850 can be shaped to enclose a space between the user's eyes and the display element 104 and thereby block external light sources. The additional user engagement portion 850 can include or be coupled to the frame 102 and optionally extend across the bridge 808 and/or the nose pads 806 of the frame module 100. One or both of the user engagement portions 150 and 850 can be configured to conform to contours of the user's face. For example, the user engagement portions 150 and 850 can include a flexible material. By further example, the user engagement portions 150 and 850 can include a material that conforms during an initial stage and hardens (e.g., cures) to a desired shape that is maintained beyond the initial stage.

Accordingly, one of the different user engagement portions 150 and 850 can be selected at different times to achieve desired performance of the head-mounted device.

Accordingly, embodiments of the present disclosure provide a head-mounted device with exchangeable modules that provide a variety of different components and functions to achieve the results that are desired by a user. The modular configurations allow a user to easily customize a head-mounted device with one or more arm modules to provide features that integrate with other operations of the frame module of the head-mounted device. The arm modules can be easily exchanged with each other to provide different components and functions at different times. Accordingly, a frame module of the present disclosure need not include permanent components that provide every function that will later be desired by the user. Instead, the head-mounted device can have expanded and customizable capabilities by the use of one or more arm modules.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out"

of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mounted device comprising:
   a frame module comprising:
      a frame;
      a light projector supported by the frame;
      a waveguide supported by the frame;
      a sensor;
      a first attachment element; and
      a first communication interface;
   a first arm module comprising:
      a first controller comprising a first processing unit;
      a first display driver operable by the first controller;
      a second attachment element; and
      a second communication interface, wherein, when the first arm module is attached to the frame module, the light projector is operably connected to the first display driver such that the first display driver controls operation of the light projector at a first resolution via the first communication interface and the second communication interface, and such that the first controller is operably connected to the sensor via the first communication interface and the second communication interface;
   a second arm module comprising:
      a second controller comprising a second processing unit;
      a second display driver operable by the second controller;
      a third attachment element; and
      a third communication interface, wherein, when the second arm module is attached to the frame module, the light projector is operably connected to the second display driver such that the second display driver controls operation of the light projector at a second resolution, different than the first resolution, via the first communication interface and the third communication interface, and such that the second controller is operably connected to the sensor via the first communication interface and the third communication interface; and
   a release mechanism for releasing the first arm module or the second arm module from the frame module.

2. The head-mounted device of claim 1, wherein the first arm module further comprises:
   a microphone;
   a speaker; and
   a battery for providing power to the light projector of the frame module.

3. The head-mounted device of claim 1, wherein:
   the first arm module further comprises:
      a fourth attachment element; and
      a fourth communication interface; and
   the head-mounted device further comprises an additional module comprising:
      a fifth attachment element;
      a fifth communication interface; and
      a third display driver.

4. The head-mounted device of claim 3, wherein the additional module is magnetically mountable to the first arm module by a magnetic coupling between the fourth attachment element and the fifth attachment element.

5. The head-mounted device of claim 1, wherein the sensor is configured to detect a feature of a user wearing the head-mounted device.

6. The head-mounted device of claim 1, wherein the first communication interface is supported on the first attachment element, and the second communication interface is supported on the second attachment element.

7. The head-mounted device of claim 1, wherein the first attachment element and the second attachment element guide movement of the first arm module relative to the frame module until the first communication interface is communicatively connected to the second communication interface via a wireless communication link.

8. A head-mounted device comprising:
   a frame module comprising:
      a frame;
      a communication interface;
      a light projector supported by the frame; and
      an electronic component supported by the frame;
   a first arm module removably attachable to a portion of the frame module and comprising;
      a first display driver operably connected to the light projector via the communication interface and to control operation of the light projector at a first resolution when the first arm module is attached to the portion of the frame module; and
      a first controller operably connected to the first display driver and operably connected to the electronic component when the first arm module is attached to the frame module; and
   a second arm module removably attachable to the portion of the frame module and comprising;
      a second display driver operably connected to the light projector via the communication interface and to control operation of the light projector at a second resolution, different than the first resolution, when the second arm module is attached to the portion of the frame module; and
      a second controller operably connected to the second display driver and operably connected to the electronic component when the second arm module is attached to the portion of the frame module, the first arm module being exchangeable with the second arm module at the portion of the frame.

9. The head-mounted device of claim 8, wherein:
the frame module further comprises:
a third controller;
a first attachment element; and
a first communication interface;
the first arm module further comprises:
a second attachment element; and
a second communication interface, wherein, when the first arm module is attached to the frame module, the third controller is operably connected to the first display driver via the first communication interface and the second communication interface; and
a release mechanism on an outer surface of the head-mounted device for releasing the first arm module from the frame module.

10. The head-mounted device of claim 9, wherein:
the first arm module further comprises:
a third attachment element; and
a third communication interface;
the head-mounted device further comprises an additional module comprising:
an additional display driver;
a fourth attachment element; and
a fourth communication interface, wherein, when the additional module is attached to the first arm module, the second display driver is operably connected to the third controller via the third communication interface and the fourth communication interface.

11. The head-mounted device of claim 10, wherein the additional module comprises a sensor.

12. The head-mounted device of claim 9, wherein:
the frame module further comprises:
a third attachment element; and
a fifth communication interface;
the head-mounted device further comprises an additional module comprising:
an additional display driver;
a fourth attachment element; and
a sixth communication interface, wherein, when the additional module is attached to the frame module, the additional display driver is operably connected to the third controller via the fifth communication interface and the sixth communication interface.

13. The head-mounted device of claim 12, wherein the additional module comprises a sensor.

14. The head-mounted device of claim 8, wherein the first arm module is removable from the frame module without requiring deformation of the first arm module or the frame module.

15. The head-mounted device of claim 8, wherein the first arm module is exchangeable with the second arm module on the frame module without requiring a tool.

16. A head-mounted device comprising:
a frame module comprising:
a frame;
a controller within the frame;
an attachment element; and
a display element;
a first arm module comprising a first display driver for operating the display element at a first resolution, wherein the first display driver is operably connected to the controller via the attachment element and to control operation of the display element when the first arm module is directly attached to the attachment element; and
a second arm module comprising a second display driver for operating the display element at a second resolution, different than the first resolution, wherein the second display driver is operably connected to the controller via the attachment element and to control operation of the display element when the second arm module is directly attached to the attachment element.

17. The head-mounted device of claim 16, wherein the frame module further comprises a release mechanism on an outer surface of the frame module for releasing the first arm module or the second arm module from the attachment element.

18. The head-mounted device of claim 16, wherein the display element comprises:
a light projector; and
a waveguide.

* * * * *